(12) United States Patent
Noh et al.

(10) Patent No.: US 8,837,952 B2
(45) Date of Patent: Sep. 16, 2014

(54) TEXTILE-STRUCTURE OPTICAL COMMUNICATION INTERFACE DEVICE AND SYSTEM

(75) Inventors: Kyoung Ju Noh, Daejeon (KR); Yong Ki Son, Daejeon (KR); Baesun Kim, Daejeon (KR); Il Yeon Cho, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 157 days.

(21) Appl. No.: 13/467,459

(22) Filed: May 9, 2012

(65) Prior Publication Data

US 2012/0294624 A1 Nov. 22, 2012

(30) Foreign Application Priority Data

May 18, 2011 (KR) .................. 10-2011-0046740

(51) Int. Cl.
*H04B 10/25* (2013.01)
*D03D 1/00* (2006.01)

(52) U.S. Cl.
CPC .............. *D03D 1/00* (2013.01); *D10B 2401/20* (2013.01); *H04B 10/2503* (2013.01)
USPC ........................................ 398/142; 398/141

(58) Field of Classification Search
CPC .................................................. H04B 10/2504
USPC .................................................. 398/141–142
See application file for complete search history.

(56) References Cited

U.S. PATENT DOCUMENTS

| | | | | |
|---|---|---|---|---|
| 2007/0154132 A1* | 7/2007 | Mates | ............................ | 385/14 |
| 2007/0223306 A1* | 9/2007 | Toennessen | .................... | 367/15 |
| 2008/0159689 A1* | 7/2008 | Mershon et al. | ................ | 385/14 |
| 2010/0209105 A1 | 8/2010 | Shin et al. | | |
| 2011/0069974 A1 | 3/2011 | Kim et al. | | |

FOREIGN PATENT DOCUMENTS

| | | | |
|---|---|---|---|
| KR | 10-2007-108740 | 11/2007 | |
| KR | 10-2010-059194 | 6/2010 | |
| KR | 10-2010-093903 | 8/2010 | |
| KR | 10-2011-032847 | 3/2011 | |
| WO | WO 2009010060 A1 * | 1/2009 | ............... G02B 6/00 |

OTHER PUBLICATIONS

Kyoung Ju Noh et al., "Wearable Network using Optical e-Textile Antenna for NLOS", 2012 IEEE International Conference on Consumer Electronics (ICCE).

* cited by examiner

*Primary Examiner* — Leslie Pascal
(74) *Attorney, Agent, or Firm* — Staas & Halsey LLP

(57) ABSTRACT

A textile-structure optical communication interface device includes a diffusing unit configured to diffuse an optical signal including information transmitted between information devices. Further, the textile-structure optical communication interface device includes a condensing unit configured to condense the optical signal. Further, a textile-structure optical communication interface system includes a textile-structure optical communication interface device configured to enable optical fibers to be woven with yarns and to transmit and receive information between information devices. Furthermore, the textile-structure optical communication interface system includes a signal processing unit configured to signal-process the information transmitted and received between the information devices.

10 Claims, 7 Drawing Sheets

TEXTILE-STRUCTURE OPTICAL COMMUNICATION INTERFACE DEVICE AND SYSTEM

CROSS-REFERENCE TO RELATED APPLICATION(S)

The present invention claims priority of Korean Patent Application No. 10-2011-0046740, filed on May 18, 2011, which is incorporated herein by reference.

FIELD OF THE INVENTION

The present invention relates to optical communication interface technology; and more particularly to a textile-structure optical communication interface device and system, which has a textile structure easily harmonized with textile fabrics or clothes, and which is suitable for information exchange between information devices using light that is not harmful to the human body.

BACKGROUND OF THE INVENTION

With the development of technology for computing, various types of devices offering personalized information have been developed. For example, computational research and the development of clothes which people normally wear, or various research activities, in which attempts have been made to insert a computational function into a variety of accessories, such as hats or bags, which people use in daily life or into daily necessities such as curtains that are made of fiber or textile, have been noticeably being undertaken.

As a variety of computers have been developed, communication with external devices is actually regarded as an important factor in the development of various applications. A wearable computer, which is representative of computational systems made of textiles, is important for communicating with various devices offering personalized information and peripheral devices located therearound. A requirement of such a wearable computer is that it not be harmful to a communication interface, particularly a human body that is well harmonized with the textile.

Representative short-range communication methods include local area networks, Bluetooth which belongs to a WPAN (Wireless Personal Area Network), ZigBee, and the like. As for these existing methods, methods such as Bluetooth and an electromagnetic inductive coupling method which use electromagnetic waves lack countermeasures in terms of security and against the electromagnetic waves which exert an influence on the human body.

Further, free-space communication has the advantage of low power consumption when performing communication, and uses an infrared data association (IrDA) using infrared light or uses visible light communication (VLC) using visible light. A restriction placed on free-space communication is that communication can be maintained only when a line of sight (LoS) is ensured in view of the characteristics of optical communication.

There has been a lot of previous research into optical communication that is not harmful to the human body for the purpose of providing information exchange between information devices such as mobile phones. The optical communication uses infrared light or visible light and has the advantage of low power consumption when performing communication.

There is the restriction that, to ensure a LoS because of the characteristics of optical communication, a light emitter and a receiver of a photodetector need to be located within a certain distance and angular range within which they can communicate with each other.

Thus, a user experiences difficulty in that the user needs to manually place the information devices at the correct position to perform information exchange using conventional optical communication.

SUMMARY OF THE INVENTION

In view of the above, the present invention provides textile-structure optical communication interface technology, which provides a textile structure which is easily harmonized with textile fabrics, and which enables data exchange with an information device using communication based on light, such as infrared or visible light.

In detail, the present invention to eliminate the manual work of a user adjusting positions and the angles of two information devices for information exchange and to enable information exchange between the information devices using optical communication even at a position where a line of sight (LoS) is not ensured.

In accordance with a first aspect of the present invention, there is provided a textile-structure optical communication interface device including: a diffusing unit configured to diffuse an optical signal including information transmitted between information devices; and a condensing unit configured to condense the optical signal.

In accordance with a second aspect of the present invention, there is provided a textile-structure optical communication interface system including: a textile-structure optical communication interface device configured to enable optical fibers to be woven with yarns and to transmit and receive information between information devices; and signal processing unit configured to signal-process the information transmitted and received between the information devices.

In accordance with the present invention, the device that will provide information exchange is placed in proximity to the light diffusing and condensing units of the textile-structure optical communication interface device, so that a simple connection for communication and good intuition can be provided compared to existing communication systems, such as an IrDA, in which light emitting and receiving units should be placed near each other and have to be aligned in a relatively accurate way. Further, due to the flexible textile structure, the interface device of the present invention can be independently produced in various forms, or be included in various products. Particularly, the interface device can be easily applied to an interface for communication with an external device in a product including a textile fabric or a woven or wearable computer, or communication inside the wearable computer.

BRIEF DESCRIPTION OF THE DRAWINGS

The above and other objects and features of the present invention will become apparent from the following description of embodiments given in conjunction with the accompanying drawings, in which.

DETAILED DESCRIPTION OF THE EMBODIMENTS

Figure 1A:
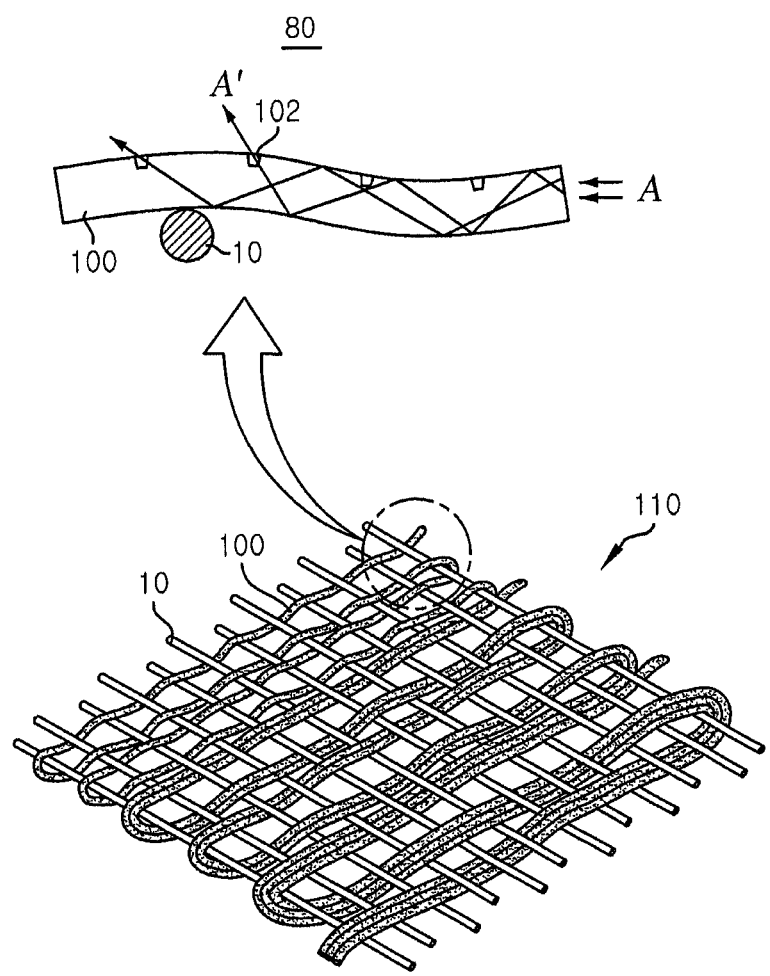
FIGS. 1A and 1B show the configuration of a textile-structure optical communication interface device in accordance with an embodiment of the present invention, in which the diffusion and condensation of light by cutting grooves in an optical fiber are exemplified, respectively.

Advantages and features of the invention and methods of accomplishing the same may be understood more readily by reference to the following detailed description of embodiments and the accompanying drawings. The invention may, however, be embodied in many different forms and should not be construed as being limited to the embodiments set forth herein. Rather, these embodiments are provided so that this disclosure will be thorough and complete and will fully convey the concept of the invention to those skilled in the art, and the invention will only be defined by the appended claims. Like reference numerals refer to like elements throughout the specification.

In the following description of the present invention, if the detailed description of the already known structure and operation may confuse the subject matter of the present invention, the detailed description thereof will be omitted. The following terms are terminologies defined by considering functions in the embodiments of the present invention and may be changed operators intend for the invention and practice. Hence, the terms need to be defined throughout the description of the present invention.

Moreover, the respective blocks or the respective sequences may indicate modules, segments, or some of codes including at least one executable instruction for executing a specific logical function(s). In several alternative embodiments, is noticed that functions described in the blocks or the sequences may run out of order. For example, two successive blocks and sequences may be substantially executed simultaneously or often in reverse order according to corresponding functions.

Prior to providing a description of the embodiment, it will be seen that the present invention relates to an interface system and structure for information exchange between information devices based on optical communication, and more particularly to textile-structure interface technology in which a wired medium such as an optical fiber or a special wave guide is used as a propagation media for the light of optical communication, thereby enabling information devices intended to provide information exchange to exchange information with each other even at positions where a line of sight (LoS) is not secure.

The textile-structure interface technology proposed by the present invention may include a structure providing light diffusion and condensation functions that facilitate harmony with a textile fabric at a specific position along the propagation of light along a wired passage for the light, so that it can support lossless bilateral data exchange between the information devices using the optical communication.

A textile-structure optical communication interface proposed by the present invention may perform communication between an electronic circuit (computational system) based on a textile fabric and an external device, communication between electronic circuits (computational systems) based on the textile fabric, communication between devices, or the like.

A textile-structure optical communication interface device in accordance with the present invention may include optical fibers and yarns that are woven to transmit and receive information between information devices.

The textile-structure optical communication interface device may include a light diffusing unit capable of diffusing light, and a light condensing unit capable of condensing light. Further, a textile-structure optical communication interface system may include the textile-structure optical communication interface device, a light emitting unit capable of transmitting an optical signal to the light diffusing unit, a light receiving unit capable of receiving an optical signal from the light condensing unit, and a signal processing unit capable of processing the transmitted and received optical signal.

Particularly, the configuration of the light diffusing and condensing units of the textile-structure optical communication interface device in accordance with the present invention may be an integrated form or a separated form as needed.

In the present invention, to establish diffusion and condensation paths of light, the optical fiber of the textile-structure optical communication interface device is cut to form grooves. Thereby, the light can be easily diffused or condensed in the optical fiber by the grooves that are cut in the optical fiber.

Here, the grooves may be formed in the optical fiber in a predetermined pattern using a cutting unit, such as a laser.

Further, in the present invention, to establish diffusion and condensation paths of light, the optical fiber of the textile-structure optical communication interface device is corrugated. Thereby, the light can be scattered in the optical fiber by a corrugated inner surface caused by the corrugation of the optical fiber and thus be widely diffused, or be condensed by the corrugated inner surface when input from the outside.

Further, the structure for diffusing and condensing the light in the textile-structure optical communication interface device of the present invention can be obtained by a combination of the corrugating of the optical fiber and the cutting of the optical fiber.

Here, the light may include one of infrared light, visible light, and a laser beam.

Hereinafter, embodiments of the present invention will be described in detail with reference to the accompanying drawings which form a part hereof.

FIGS. 1A to 2B are explanatory diagrams showing diffusion and condensation of light in a textile-structure optical communication interface device in accordance with an embodiment of the present invention.

First, the textile-structure optical communication interface device in accordance with the embodiment of the present invention will be described with reference to FIG. 1.

Figure 1B:
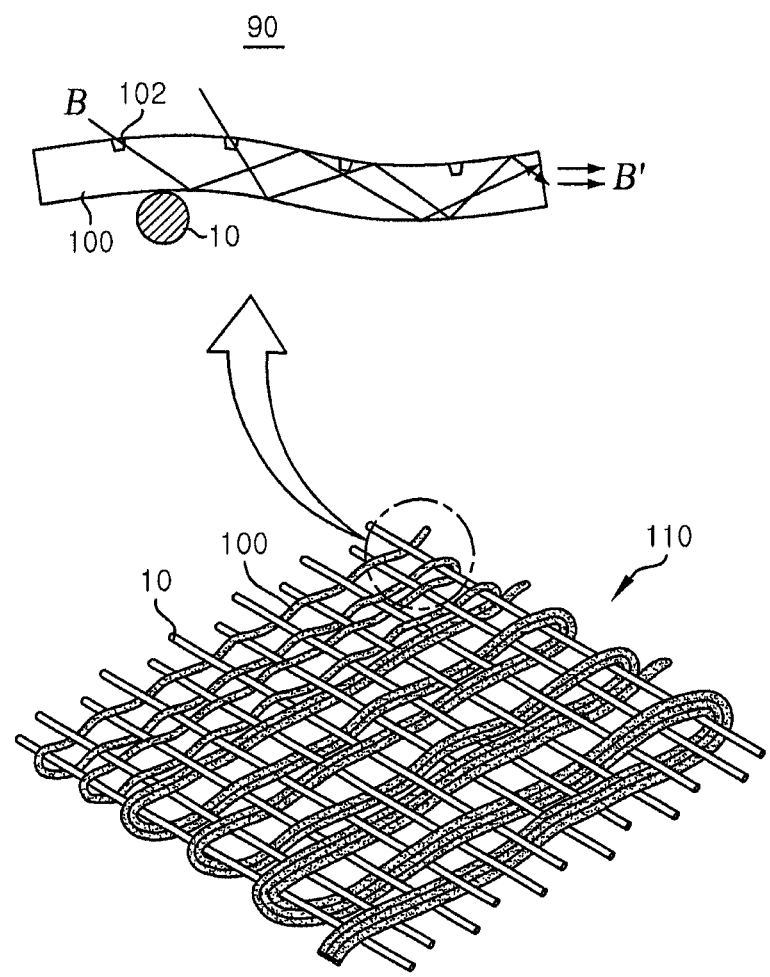

As shown in FIGS. 1A and 1B, the textile-structure optical communication interface device 110 includes a diffusing unit 80 which diffuses an optical signal including information transmitted and received between information devices, e.g., a mobile phone, a smart phone or smart pad, a tablet PC, and the like and a condensing unit 90 which condenses the optical signal.

The diffusing unit 80 includes yarns 10, optical fibers 100 woven with the yarns 10, and grooves 102 configured to allow the optical signal to be diffused in the optical fiber via an outward diffusion path A', the optical signal being input via an input path A. Further, the condensing unit 90 includes the yarns 10, the optical fibers 100 woven with the yarns 10, and the grooves 102 configured to allow the optical signal to be incident upon the optical fiber 100 and be condensed via a condensation path B', the optical signal being input via an inward input path B.

Further, in each optical fiber 100 of the textile-structure optical communication interface device 110 in accordance with the embodiment of the present invention, cutting grooves is partially performed using a cutting unit such as a laser, so that the grooves 102 may be formed in the optical fiber 100.

Here, each groove 102 serves to allow an optical signal to be diffused in the optical fiber 100 via an outward diffusion path A' on the basis of the total reflection principle when the optical signal is input into an input path A at one end of the optical fiber 100.

Further, each groove 102 serves to allow an optical signal to be incident upon the optical fiber 100 and be condensed via a condensation path B' at one end of the optical fiber 100 when the optical signal is input into an inward input path B of the optical fiber 100.

Here, the optical signal may include one of infrared light, visible light, and a laser beam.

The diameter of the optical fiber 100 ranges, e.g., from 0.2 to 0.3 mm, and each groove 102 has a diameter of, e.g., 0.01 mm or less.

Further, the distance between the grooves 102 may be 0.1 mm or less.

Figure 2A:
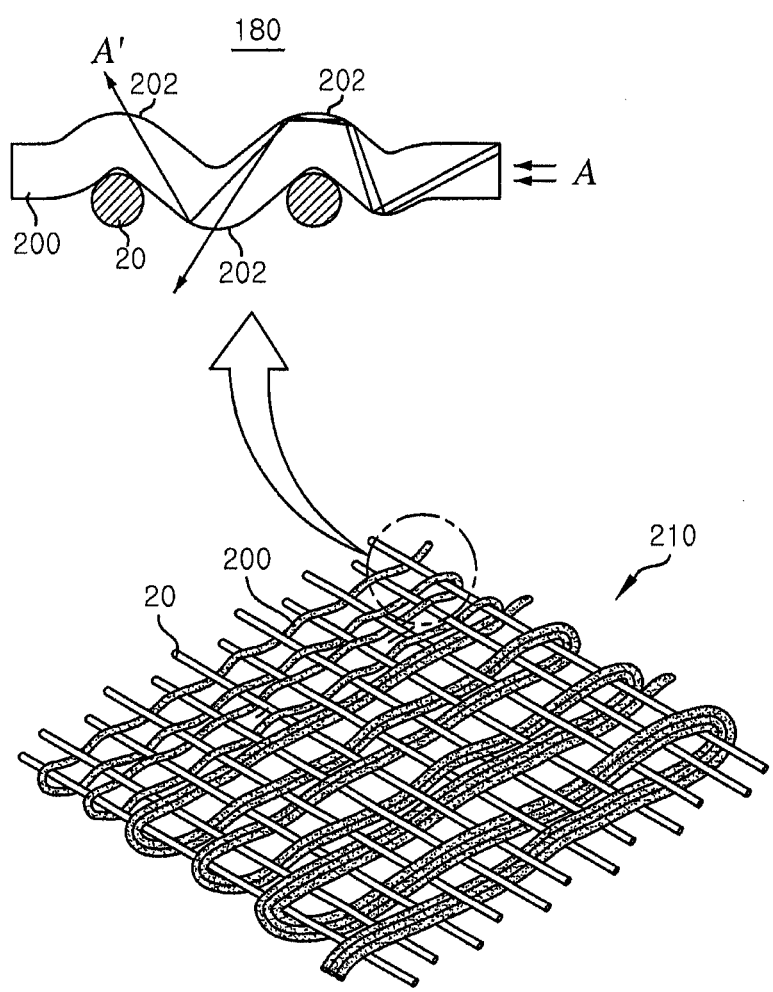
FIGS. 2A and 2B show the configuration of a textile-structure optical communication interface device in accordance with an embodiment of the present invention, in which the diffusion and condensation of light caused by corrugating an optical fiber are exemplified, respectively.
Figure 2B:
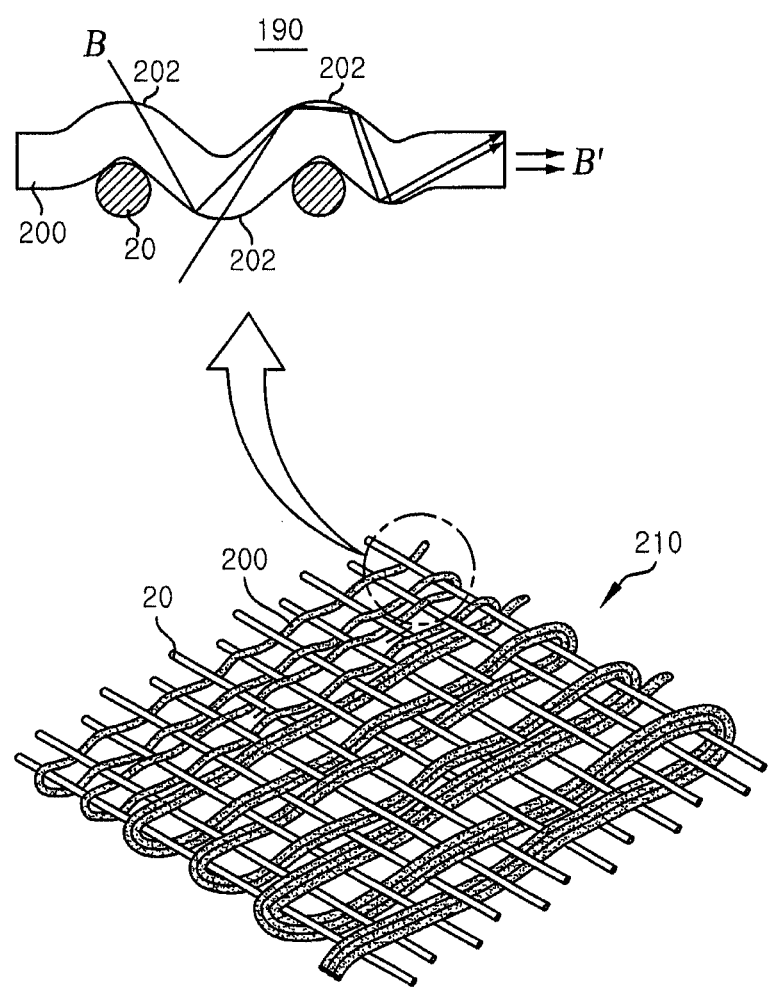

Referring to FIGS. 2A and 2B, the textile-structure optical communication interface device 210 includes a diffusing unit 180 and a condensing unit 190.

The diffusing unit 180 includes yarns 20, optical fibers 200 woven with the yarns 20, and corrugated surfaces 202 which allow the optical signal to be diffused in the optical fiber 200 via an outward diffusion path A', the optical signal being input via an input path A. Further, the condensing unit 190 includes the yarns 20, the optical fibers 200 woven with the yarns 20, and the corrugated surfaces 202 which allow the optical signal to be incident upon the optical fiber 200 and be condensed via a condensation path B', the optical signal being input via an inward input path B.

As shown in FIGS. 2A and 2B, each optical fiber 200 of the textile-structure optical communication interface device 210 in accordance with the embodiment of the present invention is corrugated within a predetermined range, and thus has corrugated inner surfaces 202.

The corrugated surfaces 202 serve to allow the optical signal to be diffused in the optical fiber 200 via an outward diffusion path A' on the basis of the total reflection principle when the optical signal is input into an input path A at one end of the optical fiber 200.

Further, the corrugated surfaces 202 serve to allow the optical signal to be incident upon the optical fiber 200 and be condensed via a condensation path B' at one end of the optical fiber 200 when the optical signal is input into an inward input path B of the optical fiber 200.

Here, the optical signal may include one of infrared light, visible light, and a laser beam.

Light diffusing and condensing functions can be easily realized along with a textile fabric by the methods shown in FIGS. 1A to 2B. It is to be noted that the two methods are combined to improve performance.

Figure 3:
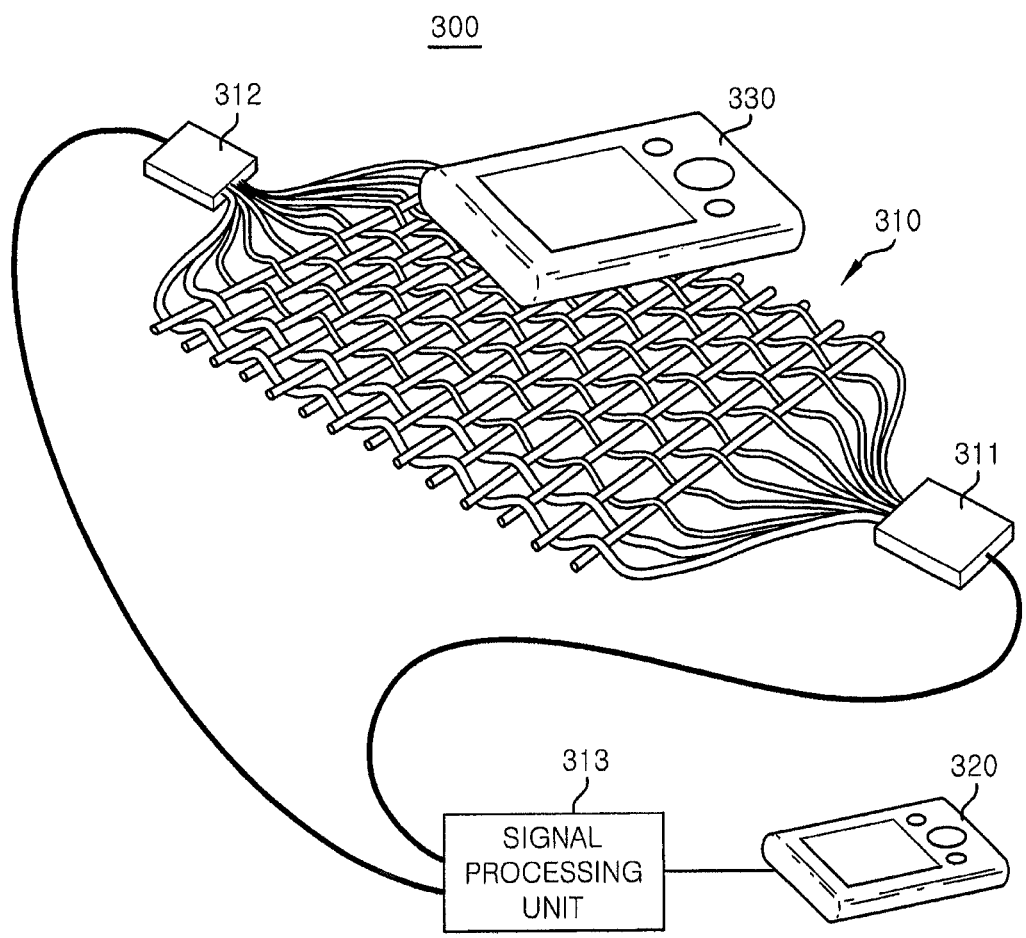
FIGS. 3 and 4 are example diagrams of performing communication between information devices in a textile-structure optical communication interface system using the textile-structure optical communication interface device in accordance with the embodiment of the present invention.
Figure 4:
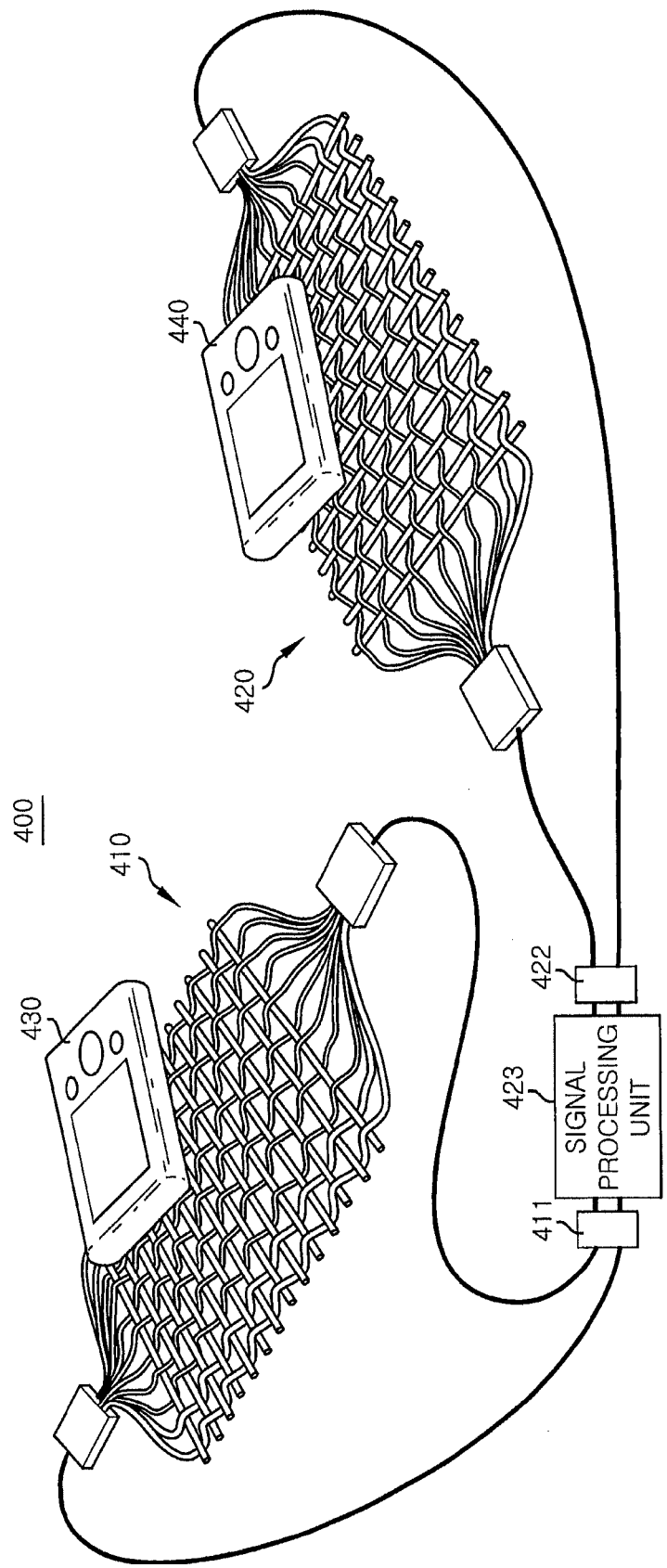

FIGS. 3 and 4 show examples of performing communication between information devices in a textile-structure optical communication interface systems 300 and 400 using the textile-structure optical communication interface devices 310, 410 and 420 in accordance with the embodiment of the present invention. As shown in FIG. 3, the textile-structure optical communication interface system 300 includes a textile-structure optical communication interface device 310, a light receiving unit 311, a light emitting unit 312, a signal processing unit 313, a first information device 320, and a second information device 330.

In FIGS. 3 and 4, the textile-structure optical communication interface devices 310, 410 and 420 may selectively employ a optical fiber having cutting grooves, a corrugated optical fiber, or a combination thereof.

FIG. 3 shows an example in which the signal processing unit 313 and the first information device 320 communicate with the second information device 330 using light diffusion and condensation of the wired textile-structure optical communication interface device.

Information transmitted from the first information device 320 along a wire may be modulated and demodulated by the signal processing unit 313, and be converted into an optical signal by the light receiving unit 311 and the light emitting unit 312.

The textile-structure optical communication interface device 310 located between and connecting the light receiving unit 311 and the light emitting unit 312 diffuses and condenses the optical signal as wide as an area of the woven textile fabric on the basis of the light diffusing and condensing functions.

Thus, the second information device 330 placed on or above the textile-structure optical communication interface device 310 receives the information from the first information device 320.

Of course, due to expansion of a communicable range, the second information device 330 can easily perform communication no matter where it is located on the textile-structure optical communication interface device 310 having the light diffusing and condensing functions.

Here, the signal processing unit 313 may further include the function of correcting for errors caused by optical signal interference. The second information device 330 may further include a unit (not shown) capable of transmitting and receiving the optical signal.

Further, examples of the information devices 320 and 330 may include various multimedia devices, such as a smart phone, a notepad, a laptop computer and a tablet computer.

FIG. 4 shows an example of performing communication between information devices or between an information device and an accessory device such as a speaker or a headphone using two textile-structure optical communication interface devices 410 and 420 in accordance with the embodiment of the present invention. Here, the information device and the accessory device may include a unit capable of transmitting and receiving an optical signal.

As shown in FIG. 4, opposite ends of the optical fiber extending from the first textile-structure optical communication interface device 410 having the light diffusing and condensing functions are connected to a signal processing unit 423 having light emitting and receiving units 411 and 422. Accordingly, the first information device 430 communicates with the second information device 440 placed on or above the second textile-structure optical communication interface device 420.

Here, the signal processing unit 423 functions to compensate for the condensed signal or to correct for an error in the condensed signal. If necessary, the first textile-structure optical communication interface device 410 may be directly connected with the second textile-structure optical communication interface device 420 using an optical fiber without using the signal processing unit 423.

Figure 5:
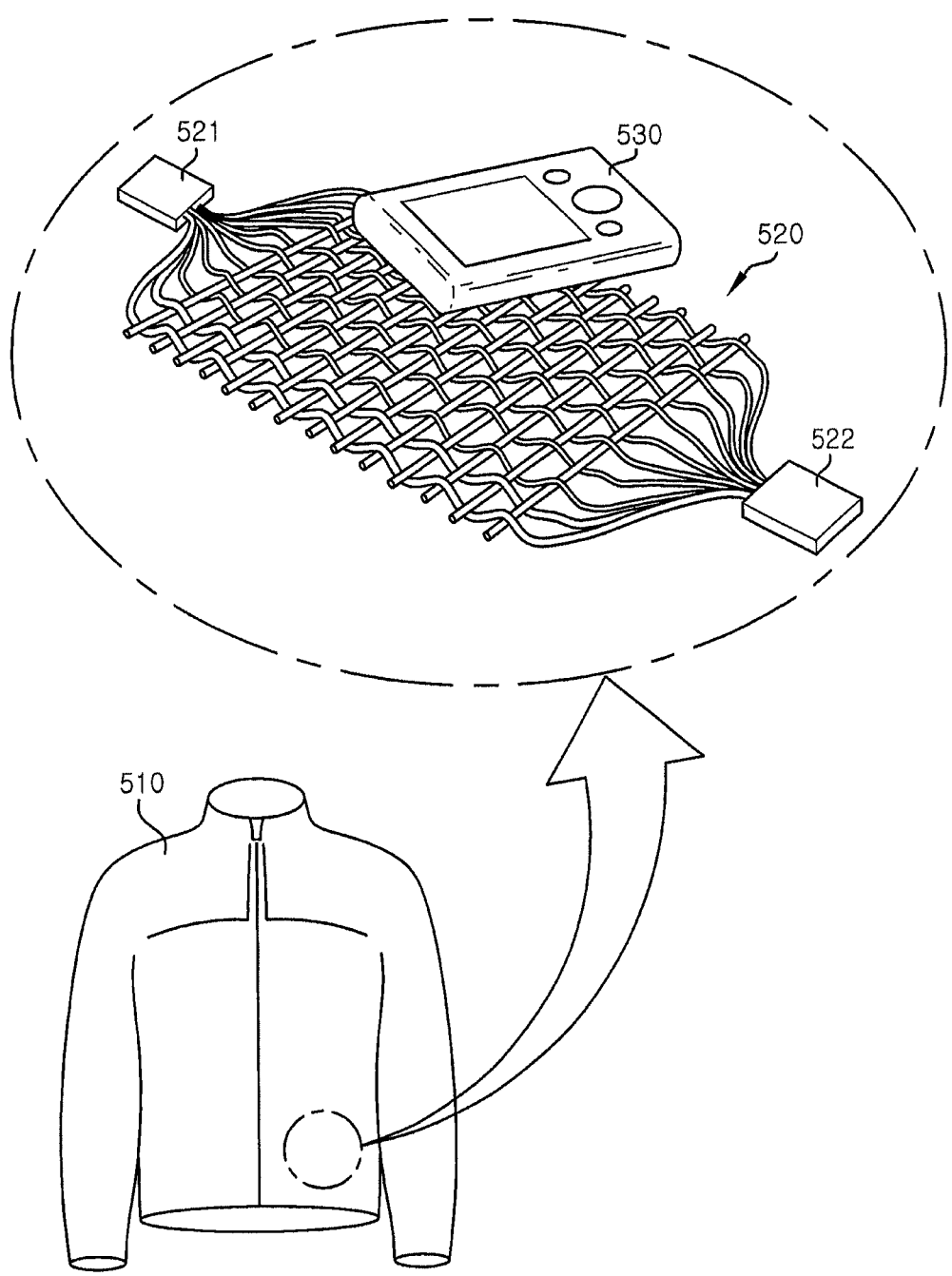
FIG. 5 is an example diagram of applying the textile-structure optical communication interface system in accordance with the embodiment of the present invention to a wearable computer device.

FIG. 5 shows an example of applying the textile-structure optical communication interface system in accordance with the embodiment of the present invention to a wearable computer.

As shown in FIG. 5, the wearable textile-structure optical communication interface system 510 in accordance with the embodiment of the present invention includes a textile-structure optical communication interface device 520, a light emitting unit 521, a light receiving unit 522, and an information device 530.

In accordance with the aforementioned embodiment of the present invention, the device that will provide information exchange is placed in proximity to the light diffusing and condensing units of the textile-structure optical communication interface device, so that a simple connection for communication and good intuition can be provided compared to existing communication systems, such as an IrDA, in which light emitting and receiving units should be placed near each other and have to be aligned in a relatively accurate way. Further, due to the flexible textile structure, the interface device of the present invention can be independently produced in various forms, or be included in various products. Particularly, the interface device can be easily applied to an interface for communication with an external device in a product including a textile fabric or a woven or wearable computer, or communication inside the wearable computer.

While the invention has been shown and described with respect to the embodiments, the present invention is not limited thereto. It will be understood by those skilled in the art that various changes and modifications may be made without departing from the scope of the invention as defined in the following claims.

What is claimed is:

1. A textile-structure optical communication interface device comprising:
    a diffusing unit configured to diffuse an optical signal including information transmitted between information devices; and
    a condensing unit configured to condense the optical signal,
    wherein the diffusing unit includes:
        yarns,
        optical fibers woven with the yarns;
        grooves configured to allow the optical signal to be diffused in the optical fiber via an outward diffusion path and configured to allow the optical signal to be incident upon the optical fiber and to be condensed via a condensation path, the optical signal being input via an inward input path,
    wherein the grooves are formed on the upper inner surface of the optical fiber in a predetermined pattern,
    wherein the optical signal is input into an input path at an end of the optical fiber and is reflected on the inner surface of the optical fiber based on a total reflection principle to be diffused via the grooves,
    wherein the optical signal is input into an inward input path of the optical fiber and is incident upon the inner surface of the optical fiber to be condensed via a condensation path at one end of the optical fiber.

2. The textile-structure optical communication interface device of claim 1, wherein the grooves are cut and formed in the optical fiber by a cutting unit.

3. The textile-structure optical communication interface device of claim 1, wherein the grooves are cut and formed in the optical fiber by a cutting unit.

4. The textile-structure optical communication interface device of claim 2, wherein each of the grooves allows the optical signal to be diffused in the optical fiber via the outward diffusion path on the basis of a total reflection principle.

5. The textile-structure optical communication interface device of claim 1, wherein each of the grooves has a diameter of 0.01 mm or less.

6. The textile-structure optical communication interface device of claim 1, wherein a distance between the grooves is 0.1 mm or less.

7. A textile-structure optical communication interface system comprising:
    a textile-structure optical communication interface device configured to enable optical fibers to be woven with yarns and to transmit and receive information between information devices; and
    a signal processing unit configured to signal-process the information transmitted and received between the information devices,
    wherein the textile-structure optical communication interface device includes:
        a diffusing unit configured to diffuse an optical signal including the information; and
        a condensing unit configured to condense the optical signal,
    wherein grooves are formed on the upper inner surface of the optical fiber in a predetermined pattern,
    wherein the optical signal is input into an input path at an end of the optical fiber and is reflected on the inner surface of the optical fiber based on a total reflection principle to be diffused via the grooves,
    wherein the optical signal is input into an inward input path of the optical fiber and is incident upon the inner surface of the optical fiber to be condensed via a condensation path at one end of the optical fiber.

8. The textile-structure optical communication interface system of claim 7, further comprising:
    a light emitting unit configured to transmit the optical signal to the diffusing unit; and
    a light receiving unit configured to receive the optical signal from the condensing unit.

9. The textile-structure optical communication interface system of claim 7, wherein the interface system begins transmission and reception of information when the information device is located adjacent to the textile-structure optical communication interface device.

10. The textile-structure optical communication interface system of claim 7, wherein the interface system stops transmission and reception of information when the information device moves away from the textile-structure optical communication interface device.

* * * * *